United States Patent
Yu et al.

(10) Patent No.: US 12,404,064 B2
(45) Date of Patent: Sep. 2, 2025

(54) FIXING ASSEMBLY AND FIXING DEVICE

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Kang Chen, Guangdong (CN); Yinghao Xie, Guangdong (CN); Xuemei Zhang, Guangdong (CN); Aixia Li, Guangdong (CN); Changdong Li, Guangdong (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 2 days.

(21) Appl. No.: 18/283,416

(22) PCT Filed: May 27, 2022

(86) PCT No.: PCT/CN2022/095690
§ 371 (c)(1),
(2) Date: Sep. 21, 2023

(87) PCT Pub. No.: WO2023/020064
PCT Pub. Date: Feb. 23, 2023

(65) Prior Publication Data
US 2024/0174400 A1    May 30, 2024

(30) Foreign Application Priority Data
Aug. 20, 2021  (CN) .......................... 202110961094.9

(51) Int. Cl.
*B65B 69/00* (2006.01)
(52) U.S. Cl.
CPC ................................ *B65B 69/0075* (2013.01)
(58) Field of Classification Search
CPC .... B69B 69/0075; F16B 21/086; F16B 21/02; F16B 21/06; F16B 21/065; F16B 21/125;
(Continued)

(56) References Cited

U.S. PATENT DOCUMENTS

| 1,788,270 | A | | 1/1931 | Baranoff |
| 2,913,953 | A | * | 11/1959 | Tendler ................. F16B 13/061 29/524.1 |

(Continued)

FOREIGN PATENT DOCUMENTS

| CN | 2043687 U | 8/1989 |
| CN | 2384033 Y | 6/2000 |

(Continued)

OTHER PUBLICATIONS

International Search Report for PCT/CN2022/095690 mailed Jul. 29, 2022, ISA/CN.

*Primary Examiner* — Mollie Impink
(74) *Attorney, Agent, or Firm* — Westbridge IP LLC

(57) ABSTRACT

A fixing assembly includes a connecting sleeve, a spike member, and an elastic member; the spike member is rotatably connected to the connecting sleeve; one end of the elastic member is connected to the connecting sleeve, and the other end of the elastic member is connected to the spike member; the elastic member at least helically surrounds and abuts against the outer peripheral wall of the spike member, and the elastic member is configured to generate elastic deformation when the spike member rotates relative to the connecting sleeve along a direction opposite to the helical surrounding direction of the elastic member; there is an (Continued)

included angle between the direction of elastic deformation and the axial extension direction of the spike member to form a helical convex elastic structure.

9 Claims, 16 Drawing Sheets

(58) Field of Classification Search
CPC .... F16B 37/041; F16B 37/042; F16B 5/0266; F16B 2019/006; F16B 13/0875; F16B 13/0841; F16B 13/0833; F16B 13/061; F16B 13/003; F16B 13/04; F16B 29/00; B65D 88/54; B65D 2231/001; A61B 17/869
USPC .................................... 411/15–80.6, 347, 438
See application file for complete search history.

(56) References Cited

U.S. PATENT DOCUMENTS

| | | | |
|---|---|---|---|
| 2,914,983 A | 12/1959 | Kopf | |
| 3,373,647 A * | 3/1968 | Sherock | F16B 37/12 411/16 |
| 3,381,566 A * | 5/1968 | Roy | F16B 13/061 411/36 |
| 3,881,393 A * | 5/1975 | Campbell | F16B 13/061 411/16 |
| 4,474,515 A * | 10/1984 | Pitzer | F16B 29/00 411/16 |
| 4,722,649 A * | 2/1988 | Ferguson | F16B 21/00 24/453 |
| 4,812,097 A * | 3/1989 | Moulton | F16B 21/02 411/347 |
| 4,832,548 A * | 5/1989 | Strobel | F16B 19/1063 411/42 |
| 2013/0226251 A1 | 8/2013 | Chegini et al. | |

FOREIGN PATENT DOCUMENTS

| | | | | |
|---|---|---|---|---|
| CN | 103407797 A | | 11/2013 | |
| CN | 204606707 U | | 9/2015 | |
| CN | 113002906 A | | 6/2021 | |
| CN | 113262030 A | | 8/2021 | |
| CN | 113830445 A | | 12/2021 | |
| GB | 1183249 A | | 3/1970 | |
| GB | 2137157 A | * | 10/1984 | ......... B65B 69/0008 |

* cited by examiner

FIG. 6
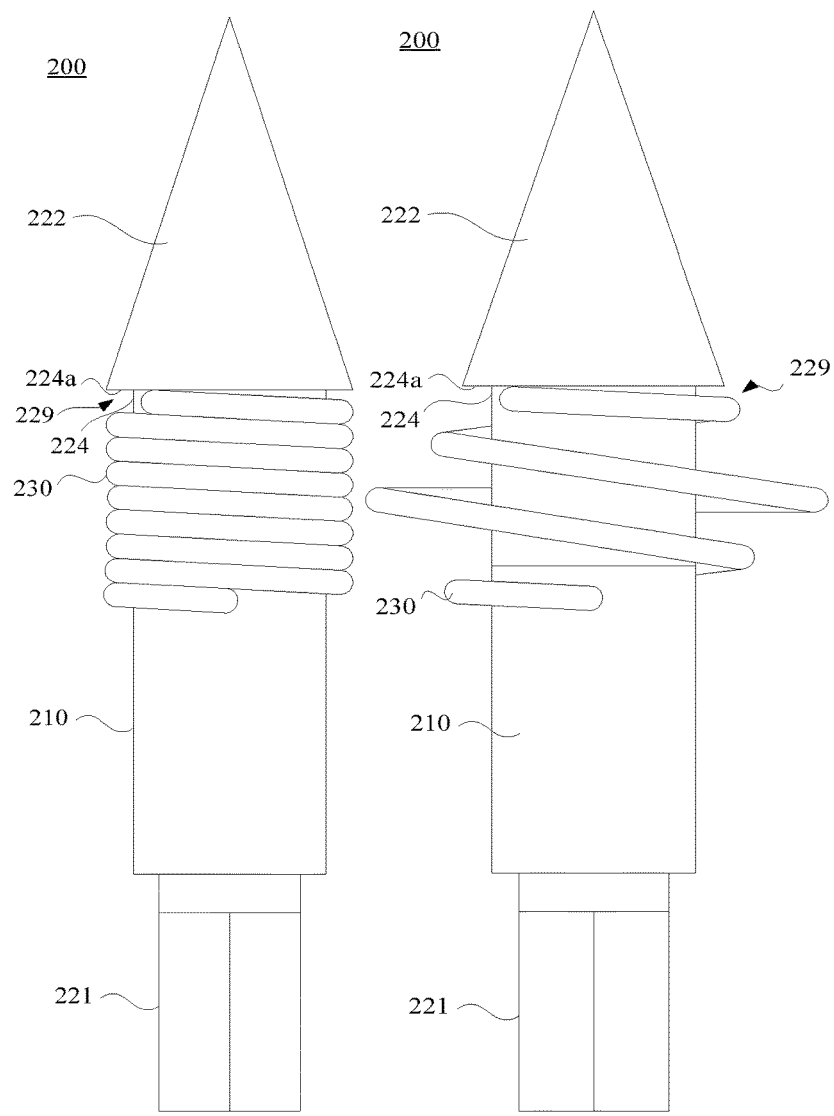
FIG. 7  FIG. 8

FIXING ASSEMBLY AND FIXING DEVICE

The present application is a National Phase entry of PCT Application No. PCT/CN2022/095690, filed on May 27, 2022, which claims priority to Chinese Patent Application No. 202110961094.9, titled "FIXING ASSEMBLY AND FIXING DEVICE", filed on Aug. 20, 2021 with the China National Intellectual Property Administration, which are incorporated herein by reference in their entireties.

FIELD

The present application relates to the technical field of new energy material recycling, and in particular to a fixing assembly and a fixing device.

BACKGROUND

A waste battery, after being recycled, needs to be disassembled, dried, pyrolyzed, crushed and screened, and then acid-leached with sulfuric acid to remove impurities such as copper, iron, and aluminum in the battery powder before entering subsequent processes. At present, the battery powder is generally packaged and transported in ton bags. After the ton bags are transported to the designated places through turnover boxes, the bottom of each ton bag should be simply fixed, so as to prevent the ton bag from falling into a work bin when it is dumped. However, when the ton bag needs to be fixed, simply the four corners or edges of the upper end of the ton bag can typically be fixed to facilitate the ton bag dumping because the ton bag is heavy and the space around the turnover box is compact, which makes the ton bag difficult to locate.

SUMMARY

An object of the present application is to overcome the shortcomings in the conventional technology and provide a fixing assembly and a fixing device that facilitate the positioning of the ton bag.

The object of the present application is achieved through the following technical solutions:

a fixing assembly includes:
  a connecting sleeve;
  a spike piece rotatably connected to the connecting sleeve; and
  an elastic piece, and one end of the elastic piece is connected to the connecting sleeve, and the other end of the elastic piece is connected to the spike piece, the elastic piece at least spirally winds around and holds the outer peripheral wall of the spike piece, and the elastic piece is used to generate elastic deformation in case that the spike piece rotates relative to the connecting sleeve in a direction opposite to the spiral winding direction of the elastic piece, an included angle exists between the direction of elastic deformation and the axial extension direction of the spike piece, so as to form a spiral convex elastic structure.

A fixing device includes a turnover box and the fixing assembly according to any one of the above embodiments, and the turnover box is provided with an accommodating groove and a mounting hole which are communicated with each other, and the connecting sleeve is located in the mounting hole and is fixedly connected to the turnover box. The spike piece and the elastic piece are both located in the accommodating groove, and one end of the spike piece protrudes from the outer side of the turnover box.

Compared with the conventional technology, the present application at least has the following advantages:

1) in the fixing assembly of the present application, the connecting sleeve can be fixedly mounted at the mounting position. For example, the connecting sleeve can be fixedly mounted on the inner wall of the accommodating groove of the turnover box. Since the spike piece is rotatably connected with the connecting sleeve, and one end of the elastic piece is connected to the connecting sleeve, the other end of the elastic piece is connected with the spike piece, and the elastic piece spirally winds at least the outer peripheral wall of the spike piece. In case that the ton bag is placed in the accommodating groove in the turnover box and the spike piece is pierced and inserted into the surface layer of the ton bag, the spike piece rotates relative to the connecting sleeve in the direction opposite to the spiral winding direction of the elastic piece. The elastic piece is used to generate elastic deformation in case that the spike piece rotates relative to the connecting sleeve in a direction opposite to the spiral winding direction of the elastic piece. An included angle exists between the direction of elastic deformation and the axial extension direction of the spike piece, so that the elastic piece bounces outwards and forms a spiral convex elastic structure which opens outwards to the outer peripheral wall of the spike piece, which plays a role in elastic pressing and fixing the inner wall of the ton bag. In this way, it plays a fixing and limiting role similar to the "nail cap", and achieves a better fixing effect on the ton bag, that is, the ton bag is better fixed and positioned in the turnover box, so as to further dump the ton bag, realize the whole process of fixing and positioning the ton bags conveniently and quickly, and solve the problem of high positioning difficulty of the ton bags; 2) In the fixing assembly of the present application, in case that the ton bag does not need to be fixed, it is only necessary to rotate the spike piece relative to the connecting sleeve in the same direction as the spiral winding direction of the elastic piece. That is, the elastic piece can be automatically reset and rotated and tightened around the peripheral wall of the spike piece, the spiral convex elastic structure shrinks in and tightly abuts on the outer peripheral wall surface of the spike piece, that is, the elastic piece spirally winds around and holds the outer peripheral wall of the spike piece. The spike piece can be quickly pulled out from the surface of the ton bag, realizing the state that the ton bag is immediately released in case that the fixed positioning is not required, and avoiding damaging the structure of the ton bag due to the fixed positioning, and realizing the recycling of the ton bag; 3) In the fixing assembly of the present application, in case that the spike piece is pierced and inserted into the surface layer of the ton bag, the spike piece rotates in the forward and reverse directions relative to the connecting sleeve, which may realize quick switching between two different states of fixed positioning and unfixed positioning of the ton bag by the fixing assembly, the convenience of using the fixing assembly and the positioning efficiency are greatly improved.

BRIEF DESCRIPTION OF THE DRAWINGS

To describe technical solutions in the embodiments of the present application more clearly, drawings required in the embodiments of the present application are introduced simply hereinafter. It should be understood that the following drawings shows some embodiments of the present application, which does not limit the scope. It is apparent that those skilled in the art can obtain other drawings based on these drawings without any creative work.

FIG. 6 is a schematic structural diagram of the elastic piece of the fixing assembly shown in FIG. 1 being turned away;

FIG. 7 is a schematic structural diagram of a fixing assembly of a fixing device according to another embodiment;

FIG. 8 is a schematic structural diagram of another state of the fixing assembly shown in FIG. 7;

DETAILED DESCRIPTION OF THE EMBODIMENTS

Figure 1:
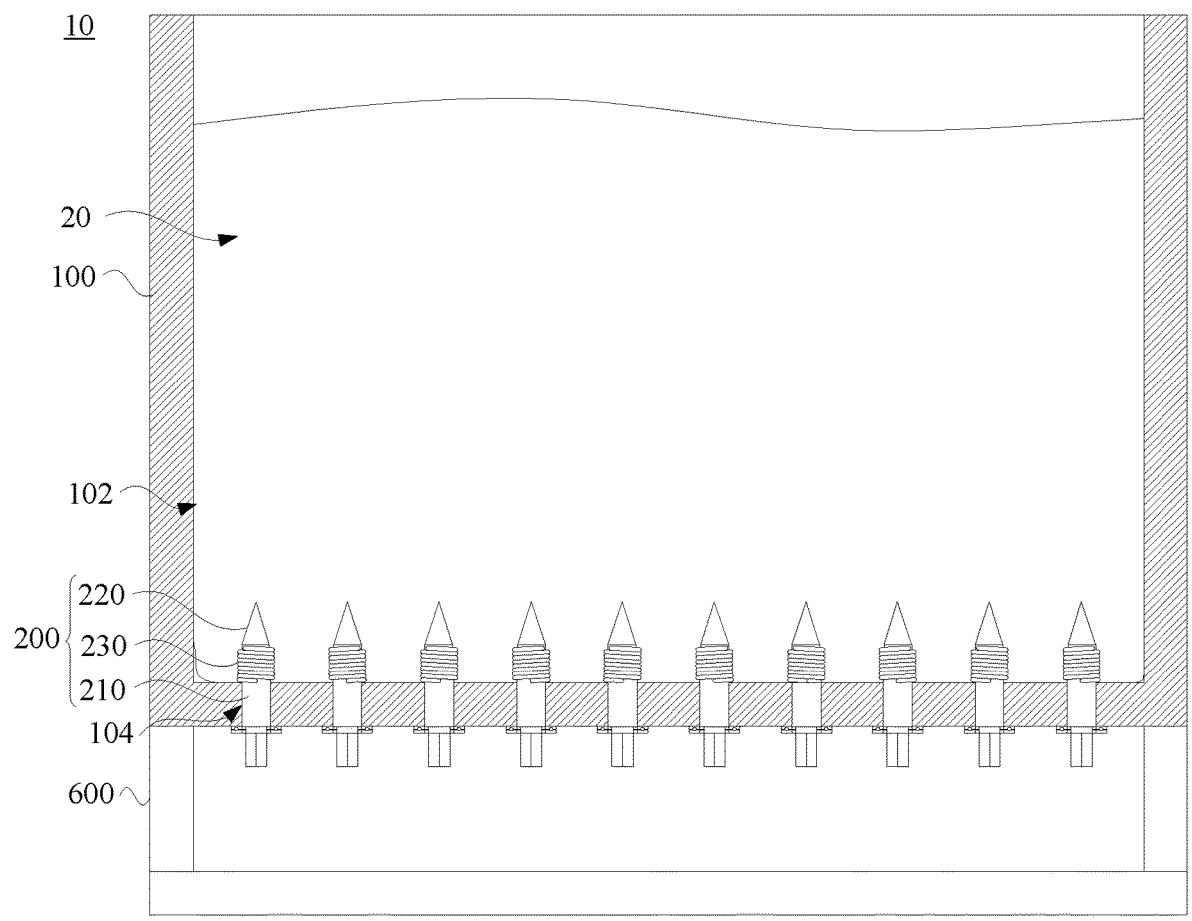
FIG. 1 is a schematic structural diagram of a use state of a fixing device of an embodiment.

In order to facilitate the understanding of the present application, the present application will be described in full details with reference to the relevant drawings. The preferred embodiments of the present application are shown in the drawings. However, the present application can be implemented in many different forms and is not limited to the embodiments described herein. On the contrary, the purpose of providing these embodiments is to make the disclosure of the present application more through and comprehensive. It should be noted that when an element is referred to as being "fixed" to the other element, it can be directly on the other element or another element is existed between them. When an element is considered to be "connected" to the other element, it can be directly connected to the other element or another element is connected between them. As used herein, the terms "vertical", "horizontal", "left", "right" and similar expressions are for the purpose of illustration only, and do not imply an only embodiment. Unless otherwise defined, all technical and scientific terms used herein have the same meanings as commonly understood by those skilled in the technical field of the present application. The terms used in the specification of the present application are only for the purpose of describing specific embodiments, and are not intended to limit the present application. The term "and/or" as used herein includes any and all combinations of one or more related listed items.

Figure 2:
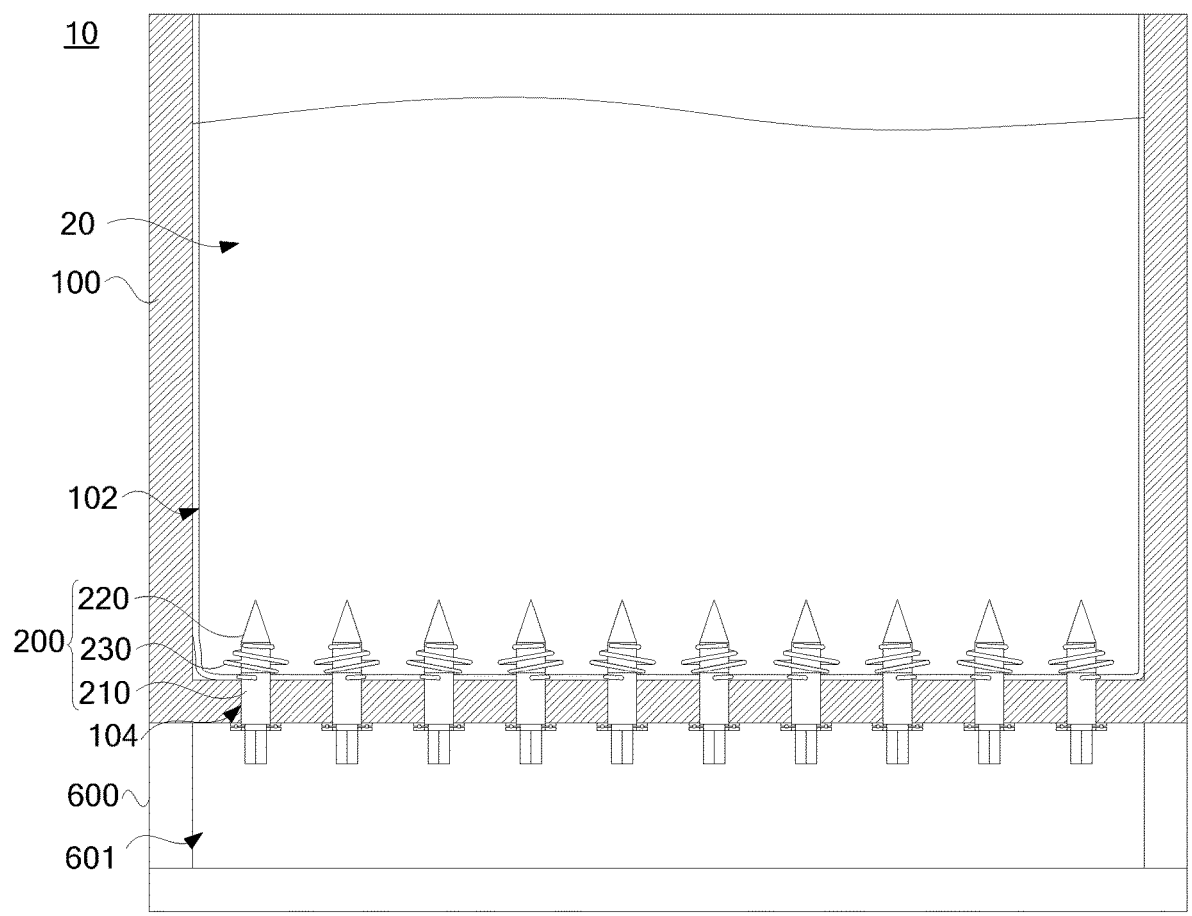
FIG. 2 is a schematic structural diagram of another use state of the fixing device shown in FIG. 1.

As shown in FIG. 1 and FIG. 2, a fixing device 10 in an embodiment includes a turnover box 100 and a fixing assembly 200, and the turnover box 100 is provided with an accommodating groove 102 and a mounting hole 104 which are communicated with each other. In this embodiment, the fixing device 10 is used to fix the ton bag 20 in order to carry out the pouring operation. The accommodating groove 102 is used for accommodating a ton bag. The fixing assembly 200 is connected to the turnover box 100, and the fixing assembly 200 is partially located in the accommodating groove 102 for fixing the ton bag.

Figure 3:
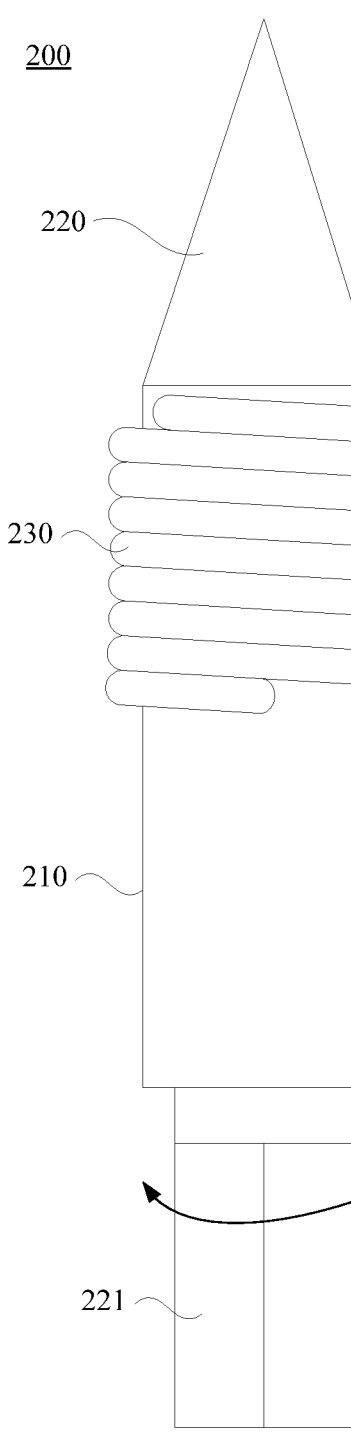
FIG. 3 is a schematic structural diagram of a fixing assembly of the fixing device shown in FIG. 1.

Referring to FIG. 3, in one of the embodiments, the fixing assembly 200 includes a connecting sleeve 210, a spike piece 220 and an elastic piece 230. The connecting sleeve 210 is located in the mounting hole 104 and is fixedly connected to the turnover box 100. The spike piece 220 is rotatably connected with the connecting sleeve 210. One end of the elastic piece 230 is connected to the connecting sleeve 210, and the other end of the elastic piece 230 is connected to the spike piece 220. The elastic piece 230 at least spirally winds around and is secured on the outer peripheral wall of the spike piece 220. That is, the elastic piece 230 at least spirally winds around and holds the outer peripheral wall of the spike piece 220 along the winding direction. It can be understood that, in one of the embodiments, the elastic piece 230 is connected to the spike piece 220 and the connecting sleeve 210, and in case that the elastic piece 230 is not deformed, the elastic piece 230 at least spirally winds around and holds the outer peripheral wall of the spike piece 220, that is, the elastic piece 230 at least spirally tightly winds around and holds the outer peripheral wall of the spike piece 220.

Figure 4:
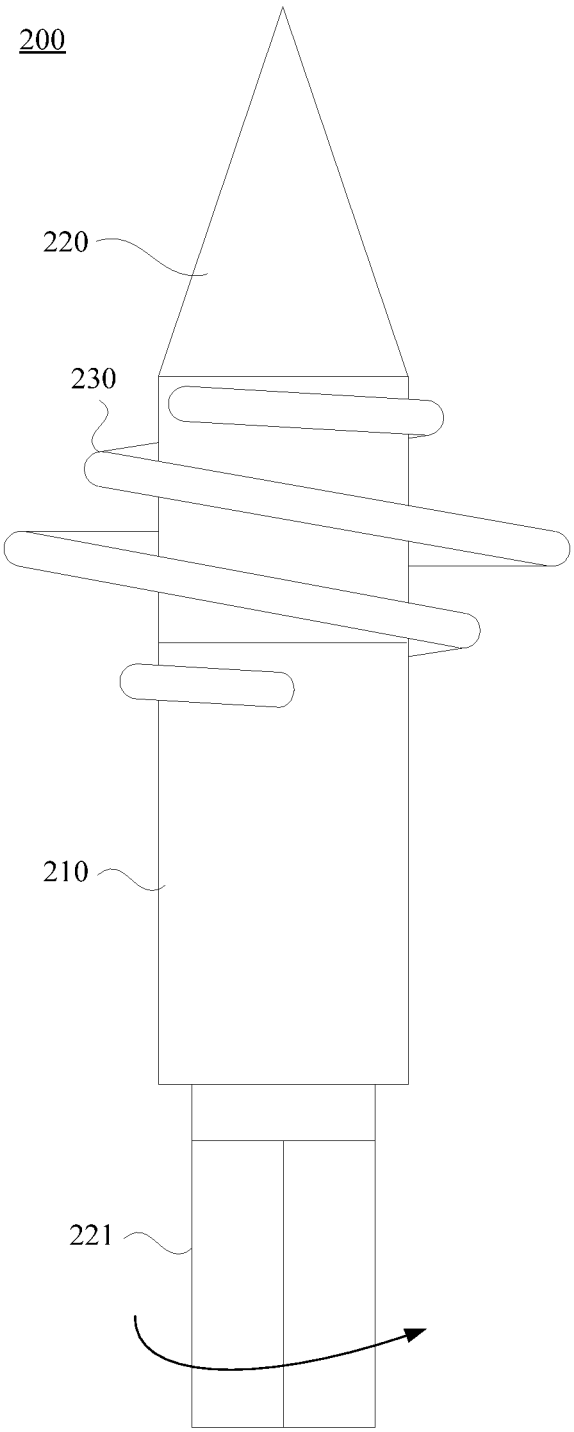
FIG. 4 is a schematic structural diagram of another state of the fixing assembly shown in FIG. 3.
Figure 5:
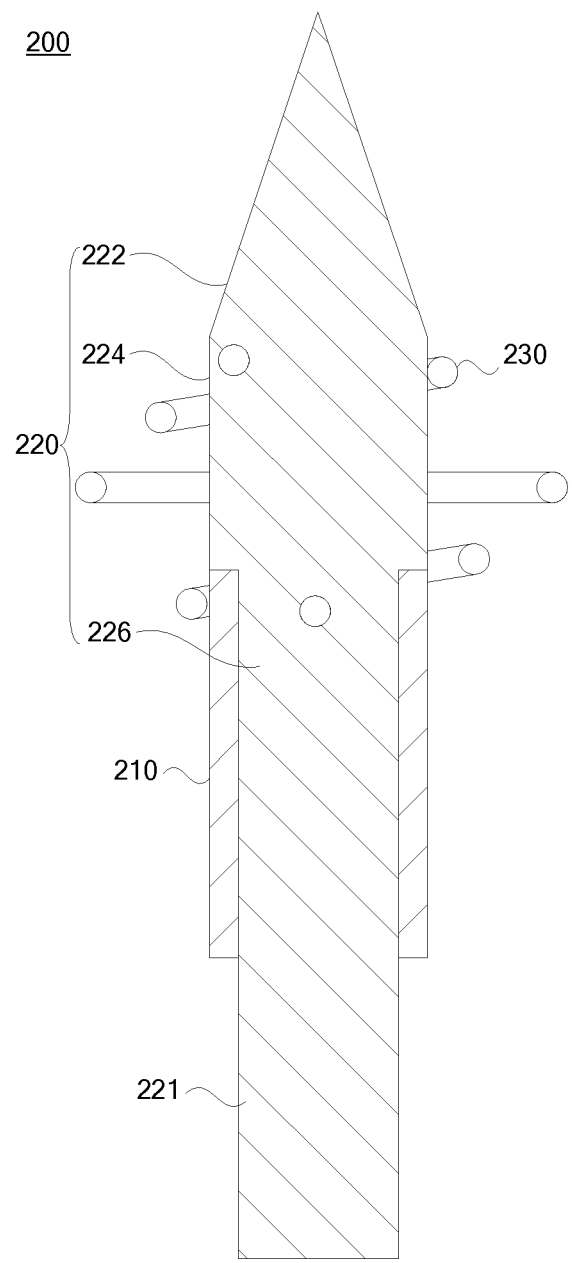
FIG. 5 is a schematic cross-sectional view of the fixing assembly shown in FIG. 4.

As shown in FIG. 4 and FIG. 5, the elastic piece 230 is used to generate elastic deformation in case that the spike piece 220 rotates relative to the connecting sleeve 210 in a direction opposite to the spiral winding direction of the elastic piece 230, and there is an included angle between the direction of elastic deformation and the axial extension direction of the spike piece 220. That is, the direction of elastic deformation is not parallel to the axial extension direction of the spike piece 220 to form a spiral convex elastic structure, so that the spiral convex elastic structure elastically compresses and fixes the inner wall of the ton bag. That is, the spiral convex elastic structure generates an axial force parallel to the axial direction of the spike piece 220 on the inner wall of the ton bag, thus playing a role similar to the "nail cap" for elastically fixing and limiting the ton bag, thus achieving a better fixing effect on the ton bag.

In this embodiment, the so-called spiral convex elastic structure is a structural shape in which the elastic piece 230 is elastically deformed as the spike piece 220 rotates relative to the connecting sleeve 210 in a direction opposite to the spin direction of the elastic piece 230. The elastic piece 230 that generates elastic deformation spirally winds the spike piece 220 and is in a state of elastically expanding outwards. As shown in FIG. 4, the elastic piece 230 that generates elastic deformation does not completely p the outer peripheral wall of the spike piece 220. That is, the elastic piece 230 that generates elastic deformation is partially separated from the outer peripheral wall of the spike piece 220, and the elastic piece 230 is rotated and unfolded, so that the spiral convex elastic structure elastically presses and fixes the inner wall of the ton bag. It can be understood that while the spike piece 220 rotates relative to the connecting sleeve 210 in the same direction as the winding direction of the elastic piece 230, the elastic piece gradually resets. The spiral convex elastic structure gradually disappears until the elastic piece spirally winds around and holds the outer peripheral wall of the spike piece, so that the elastic piece is tightly attached to the outer peripheral wall of the spike piece.

As shown in FIG. 1 and FIG. 3, in this embodiment, the spike piece 220 and the elastic piece 230 are both located in the accommodating groove 102. Moreover, one end of the spike piece 220 protrudes from the outer side of the turnover box 100, so that the spike piece 220 may be rotated relative to the connecting sleeve 210 on the outer side of the turnover box 100, which improves the convenience of using the fixing assembly 200. In one embodiment, the spike piece 220 is located at the bottom of the accommodating groove 102, so that the spike piece 220 may pierce and position the bottom of the ton bag. Due to the gravity of the ton bag, the spike piece 220 may better pierce and position the bottom of the ton bag.

In the above fixing device 10 and fixing assembly 200, the connecting sleeve 210 can be fixedly mounted at the mounting position. For example, the connecting sleeve 210 may be fixedly mounted on the inner wall of the accommodating groove of the turnover box 100. Since the spike piece 220 is rotatably connected with the connecting sleeve 210, and one end of the elastic piece 230 is connected to the connecting sleeve 210, the other end of the elastic piece 230 is connected with the spike piece 220, and the elastic piece 230 at least spirally winds on the outer peripheral wall of the spike piece 220. In case that the ton bag is placed in the accommodating groove in the turnover box 100 and the spike piece 220 is pierced and inserted into the surface layer of the ton bag, the spike piece 220 rotates relative to the connecting sleeve 210 in the direction opposite to the spiral winding direction of the elastic piece 230. The elastic piece 230 is used to generate elastic deformation in case that the spike piece 220 rotates relative to the connecting sleeve 210 in a direction opposite to the spiral winding direction of the elastic piece 230. An included angle exists between the direction of elastic deformation and the axial extension direction of the spike piece 220, so that the elastic piece 230 bounces outwards and forms a spiral convex elastic structure which opens outwards to the outer peripheral wall of the spike piece 220, which plays a role in elastic pressing and fixing the inner wall of the ton bag. In this way, it plays a fixing and limiting role similar to the "nail cap", and achieves a better fixing effect on the ton bag, that is, the ton bag is better fixed and positioned in the turnover box 100, so as to further perform the dumping of the ton bag, realize the whole process of fixing and positioning the ton bags conveniently and quickly, and solve the problem of high positioning difficulty of the ton bags; in case that the ton bag does not need to be fixed, it is only necessary to rotate the spike piece 220 relative to the connecting sleeve 210 in the same direction as the spiral winding direction of the elastic piece 230. That is, the elastic piece 230 can be automatically reset and rotated and tightened around the peripheral wall of the spike piece 220, the spiral convex elastic structure shrinks in and tightly holds the outer peripheral wall surface of the spike piece 220, that is, the elastic piece 230 spirally winds around and holds the outer peripheral wall of the spike piece 220. The spike piece 220 can be quickly pulled out from the surface layer of the ton bag, realizing the state that the ton bag is immediately released in case that the fixed positioning is not required, and avoiding damaging the structure of the ton bag due to the fixed positioning, and realizing the recycling of the ton bag; in the fixing assembly 200 of the present application, in case that the spike piece 220 is pierced and inserted into the surface layer of the ton bag, the spike piece 220 rotates in the forward and reverse directions relative to the connecting sleeve 210, which may realize quick switching between two different states of fixed positioning and unfixed positioning of the ton bag by the fixing assembly 200, the convenience of using the fixing assembly 200 and the positioning efficiency are greatly improved.

As shown in FIG. 4, in one embodiment, a part of the elastic piece 230 spirally presses the outer peripheral wall of the spike piece 220, and another part of the elastic piece 230 spirally presses the connecting sleeve 210, so that the elastic piece 230 has a circumferential pressing length on the surface of the connecting sleeve 210 in the vicinity of the end connected to the connecting sleeve 210. Under the condition of the same spiral circumference size, in case that the spike piece 220 rotates relative to the connecting sleeve 210, the fixing assembly 200 can be switched to quickly fix or unfix the ton bag. That is, the spiral convex elastic structure can be formed or eliminated, that is, the elastic deformation of the elastic member 230 can be quickly generated or eliminated. It can be understood that, in other embodiments, the elastic piece 230 may also be completely spirally wound and pressed on the outer peripheral wall of the spike piece 220, and one end of the elastic piece 230 is connected to the edge of the connecting sleeve 210.

In one of the embodiments, the direction of elastic deformation and the axial extension direction of the spike piece 220 are perpendicular to each other. That is, the direction of elastic deformation is parallel to the plane where the radial direction of the spike piece 220 is located. In case that the spike piece 220 rotates relative to the connecting sleeve 210 in a direction opposite to the spiral winding direction of the elastic piece 230, the elastic piece 230 is elastically deformed in the radial direction of the spike piece 220. In turn, the spiral convex elastic structure may better elastically press and fix the inner wall of the ton bag. It can be understood that in other embodiments, the direction of elastic deformation is not limited to being perpendicular to the axial extension direction of the spike piece 220. For example, the included angle between the direction of elastic deformation and the axial extension direction of the spike piece 220 is greater than 5° and less than or equal to 80°.

As shown in FIG. 4, in one of the embodiments, the elastic piece 230 is a spring wire structure, so that the elastic piece 230 has better elastic strength, and the deformed spiral convex elastic structure may better elastically press and fix the inner wall of the ton bag. It can be understood that in other embodiments, the elastic piece 230 is not limited to a spring wire structure, and may also be a coil spring or an elastic rubber piece or other elastic pieces 230.

As shown in FIG. 6, in one embodiment, the cross-sectional diameter of the elastic piece 230 decreases from the middle of the elastic piece 230 to both ends of the elastic piece 230, so that the elastic deformation force generated by the elastic piece 230 can better press and act on the ton bag. The spiral convex elastic structure can more firmly hold the inner wall of the ton bag, and the deformed spiral convex elastic structure can better elastically press and fix the inner wall of the ton bag.

As shown in FIG. 5, in one of the embodiments, the spike piece 220 includes a spike end 222, a winding portion 224, and a rotating connecting portion 226 that are connected in sequence. The rotating connecting portion 226 is rotatably connected with the connecting sleeve 210, one end of the elastic piece 230 is connected to the winding portion 224, and the elastic piece 230 spirally winds around and holds the outer peripheral wall of the winding portion 224, so that the elastic piece 230 is connected to the spike piece 220, the elastic piece 230 spirally winds around and holds the spike piece 220, and the spike piece 220 is rotatably connected to the connecting sleeve 210. In this embodiment, the spike end 222 is used to pierce the surface layer of the ton bag. Further, the spike end 222 has a conical structure, so that the spike end 222 can better pierce the surface layer of the ton bag.

In order to allow the spike piece 220 to quickly pierce into the ton bag, as shown in FIG. 1, in this embodiment, the spike piece 220 is provided at the bottom of the inner wall of the accommodating groove of the turnover box 100, so that the spike piece 220 can pierce the surface layer inserted into the bottom of the ton bag in case that the ton bag is placed in the turnover box 100. In this way, under the gravity of the ton bag, the spike piece 220 can quickly pierce and be inserted into the ton bag.

Figure 9:
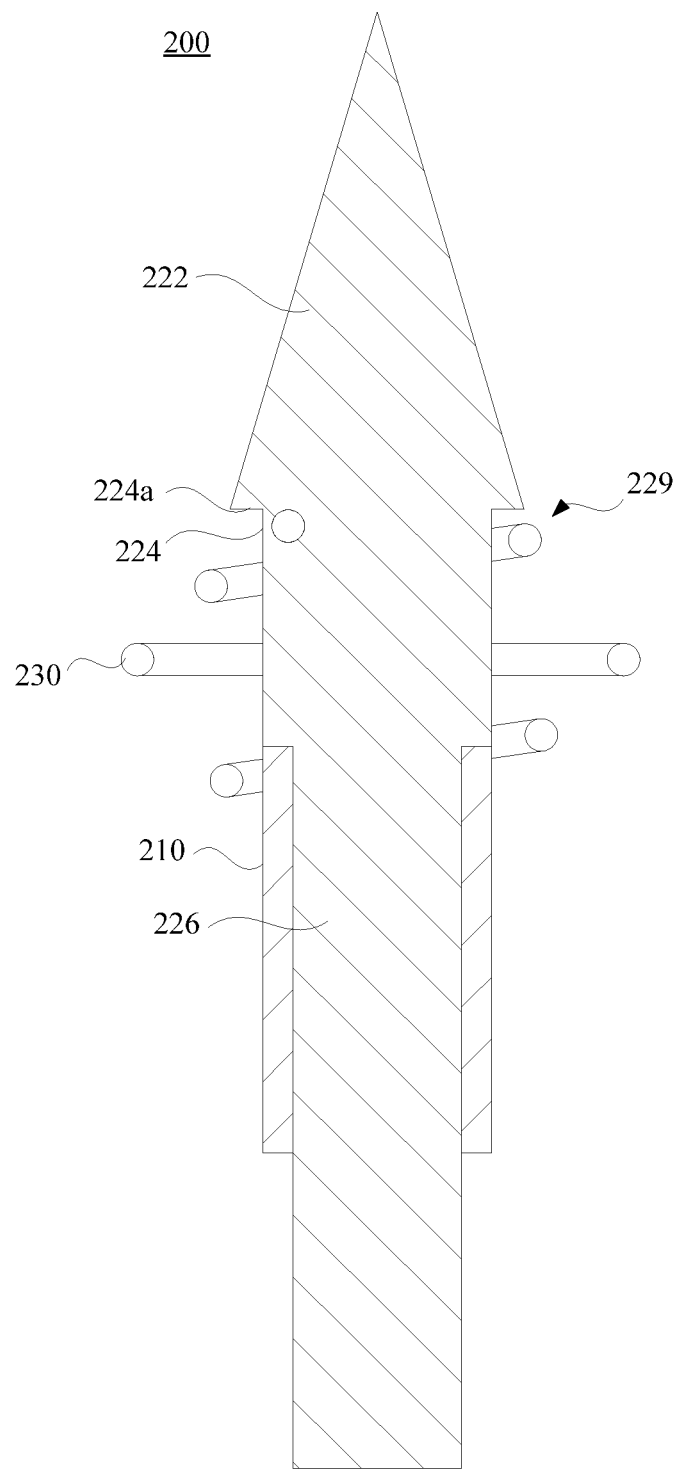
FIG. 9 is a schematic cross-sectional view of the fixing assembly shown in FIG. 8.

As shown in FIG. 7 to FIG. 9, in one of the embodiments, a limit step 224a is formed on the outer peripheral wall of the end, adjacent to the spike end 222, of the winding portion 224. That is, the diameter of the winding portion 224 for spirally winding the outer peripheral wall of the elastic piece 230 is smaller than the diameter of the adjacent winding portion 224 of the spike end 222. An accommodating groove 229 for accommodating the elastic piece 230 is formed on the outer peripheral wall of the winding portion 224 of the spike piece 220. One end of the elastic piece 230 is connected to the surface of the limit step 224a, and the elastic piece 230 spirally winds around and holds and is limited to the limit step 224a. That is, the elastic piece 230 winds around and holds the surface of the limit step 224a, so that the elastic piece 230 reliably winds around and holds the winding portion 224, and the elastic piece 230 is reliably confined to one side of the limit step 224a. The elastic piece 230 is prevented from being separated from the spike piece 220 in the process of pulling out the ton bag with the spike piece 220, and the cross section of the spike piece 220 is reduced, and that the elastic piece 230 protrudes from the outer peripheral wall of the spike piece 220 and causes greater resistance to the spike piece 220 to pierce or pull out the ton bag is also avoided, thereby the resistance of the fixing assembly 200 piercing or pulling out the ton bag is reduced, which is convenient for the fixing assembly 200 to quickly pierce or pull out the ton bag. It can be understood that when the spike piece 220 does not rotate relative to the connecting sleeve 210 in a direction opposite to the spinning direction of the elastic piece 230, the elastic piece 230 is in a spiral shape and tightly winds around and holds the outer peripheral wall of the winding portion 224. In case that the spike piece 220 rotates in a direction opposite to the spinning direction of the elastic piece 230 relative to the connecting sleeve 210, the elastic piece 230 is elastically deformed. At this time, although the elastic piece 230 that generates elastic deformation still spirally winds the spike piece 220, the elastic piece 230 is in a state of elastically expanding outward. That is, the elastic piece 230 that generates elastic deformation does not tightly hold the outer peripheral wall of the spike piece 220, so that the spiral convex elastic structure elastically presses and fixes the inner wall of the ton bag.

As shown in FIG. 7 to FIG. 9, further, the diameter of the rotating connecting portion 226 is smaller than the diameter of the winding portion 224, so that the two ends of the elastic piece 230 are respectively connected to the connecting sleeve 210 and the spike piece 220, and the elastic piece 230 can more closely wind the outer peripheral wall of the spike piece 220. That is, the elastic piece 230 can wind and hold the peripheral wall of the spike piece 220 smoothly and tightly, so that the fixing assembly 200 can better pierce the ton bag and fix the ton bag. In this embodiment, the diameter of the winding portion 224 is equal to the diameter of the connecting sleeve 210, so that the elastic piece 230 spirally winds the outer peripheral wall of the spike piece 220 more smoothly. The spiral winding structure of the elastic piece 230 at the connection between the winding portion 224 and the connecting sleeve 210 is made smoother.

Figure 10:
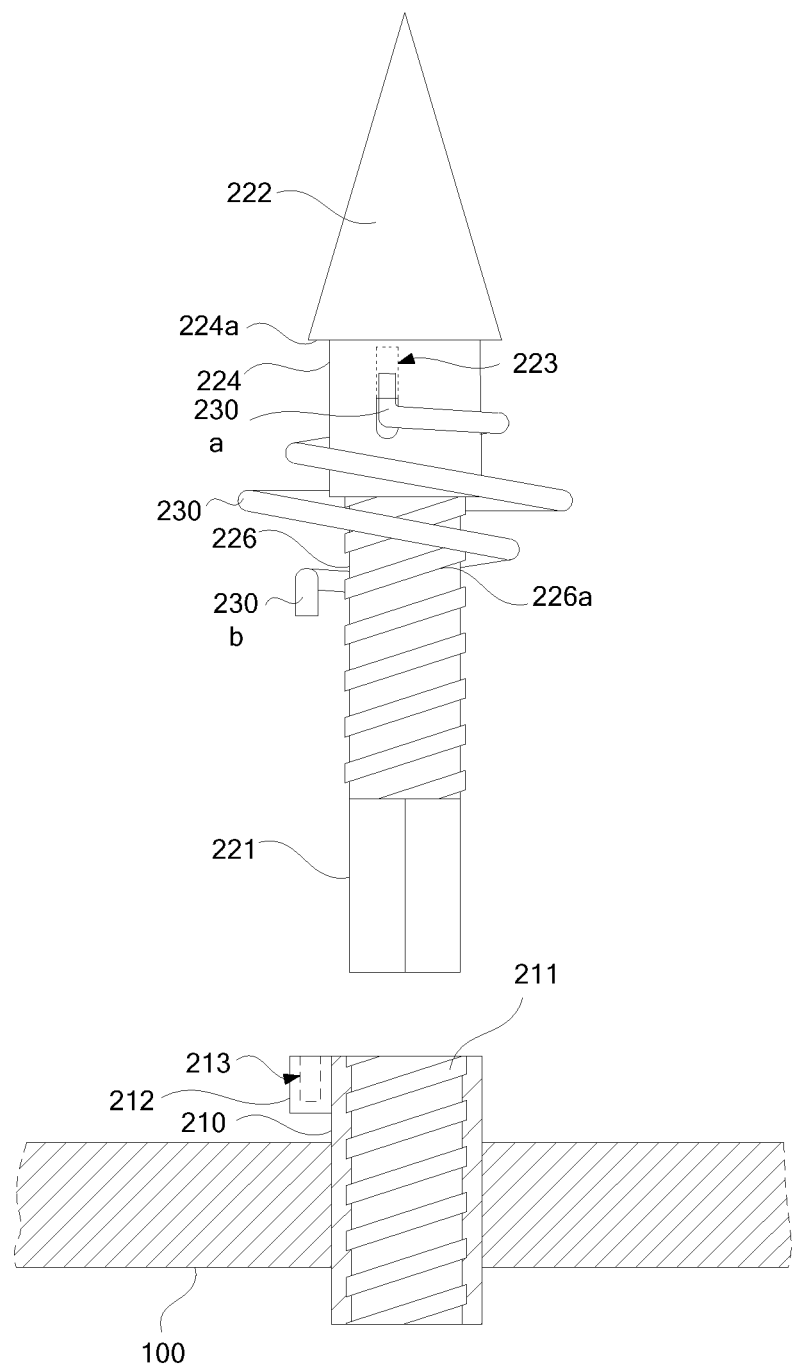
FIG. 10 is an exploded view of a fixing assembly of a fixing device according to another embodiment.

As shown in FIG. 10, further, a first thread 226a is formed on the outer peripheral wall of the rotating connecting portion 226, and a second thread 211 is formed on the inner peripheral wall of the connecting sleeve 210. The connecting sleeve 210 is mounted outside the rotating connecting portion 226 and is threadedly connected to the rotating connecting portion 226, so that the connecting sleeve 210 is rotationally connected to the rotating connecting portion 226. In addition, the rotating connecting portion 226 makes the spike piece 220 move relative to the connecting sleeve 210 in the axial direction of the spike piece 220 during the relative rotation of the connecting sleeve 210. The part where the elastic piece 230 is connected to the spike piece 220 is a first end, and the part where the elastic piece 230 and the connecting sleeve 210 are connected is a second end. In case that the spike piece 220 rotates in a direction opposite to the winding direction of the elastic piece 230 relative to the connecting sleeve 210, the spike piece 220 and the connecting sleeve 210 move relatively, reducing the distance between the first end and the second end. The spiral convex elastic structure formed in this way is flatter, which improves the axial acting force of the spiral convex elastic structure on the inner wall of the ton bag, and further enables the spiral convex elastic structure to better press and fix the inner wall of the ton bag. In this embodiment, the first thread 226a and the second thread 211 are mutually adapted threaded connection structures, so that the rotating connecting portion 226 and the connecting sleeve 210 are threadedly connected. Further, the first thread 226a spirally winds the outer peripheral wall of the rotating connecting portion 226, and the second thread 211 spirally winds the inner peripheral wall of the connecting sleeve 210, so that the first thread 226a and the second thread 211 are better threadedly connected, and the adjustment of the axial connection position between the spike piece 220 and the connecting sleeve 210 is more flexible. That is, the adjustment of the distance between the first end and the second end is more flexible.

As shown in FIG. 9, in one embodiment, the connecting sleeve 210 is mounted outside the spike piece 220 and rotationally connected with the spike piece 220, so that the relative rotational connection between the connecting sleeve 210 and the spike piece 220 is more stable. In this embodiment, the connecting sleeve 210 is mounted outside the outer peripheral wall of the rotating connecting portion 226 and is rotatably connected with the rotating connecting portion 226. Further, the first thread 226a is spirally arranged on the outer peripheral wall of the rotating connecting portion 226, the second thread 211 is spirally arranged on the inner peripheral wall of the connecting sleeve 210, so that the connecting sleeve 210 and the spike piece 220 are threadedly connected.

In order to make the structure of the fixing assembly 200 relatively simple, as shown in FIG. 8, in one of the embodiments, two ends of the elastic piece 230 are respectively welded to the outer peripheral wall of the spike piece 220 and the outer peripheral wall of the connecting sleeve 210, which enables the two ends of the elastic piece 230 to be connected to the spike piece 220 and the connecting sleeve 210, and the structure of the fixing assembly 200 is relatively simple.

Due to the heavy weight of the ton bag, however, in the process of fixing the ton bag repeatedly by the fixing device 10, both ends of the elastic piece 230 are easily broken or even separated from the spike piece 220 and the connecting sleeve 210 under the action of gravity. As a result, the fixing assembly 200 is scrapped after multiple uses, and the service life of the fixing assembly 200 is short; in addition, under the action of gravity, the elastic piece 230 of the fixing assembly 200 is prone to plastic deformation. That is, the elastic piece 230 cannot spirally tightly wind and hold the outer peripheral wall of the spike piece 220 after resetting. That is, the elastic piece 230 locally protrudes from the outer peripheral wall of the spike piece 220, so that the resistance of the spike piece 220 in the process of piercing the ton bag is relatively large, and the time required for the fixing assembly 200 to fix and position the ton bag is relatively long. After repeated use, the plastic deformation of the elastic piece 230 becomes larger, the fixing assembly 200 is eventually scrapped and unable to be used further, thus shortening the service life of the fixing assembly 200. In order to improve the service life and convenience of using the fixing assembly 200, as shown in FIG. 10, in another embodiment, two ends of the elastic piece 230 are detachably connected to the outer peripheral wall of the spike piece 220 and the outer peripheral wall of the connecting sleeve 210, so as to perform regular maintenance or replacement of the elastic piece 230, and the service life and convenience of using the fixing assembly 200 are improved. In one of the embodiments, the first end of the elastic piece 230 is provided with a first bending portion 230a, and the outer peripheral wall of the spike piece 220 is provided with a first insertion hole 223, The first bending portion is inserted into the first insertion hole 223, so that the elastic piece 230 is detachably connected to the outer peripheral wall of the spike piece 220. The second end of the elastic piece 230 is provided with a second bending portion 230b, and the outer peripheral wall of the connecting sleeve 210 is provided with a second insertion hole 213, the second bending portion is inserted into the second insertion hole 213, so that the elastic piece 230 is detachably connected to the outer peripheral wall of the connecting sleeve 210. In order to avoid the problem that the opening of the second insertion hole 213 affects the structural strength of the connecting sleeve 210, further, a mounting boss 212 is protrudingly provided on the outer peripheral wall of the connecting sleeve 210, the second insertion hole 213 is formed in the mounting boss 212, so that the position where the second insertion hole 213 is formed in the connecting sleeve 210 has better structural strength. The problem that the opening of the second insertion hole 213 affects the structural strength of the connecting sleeve 210 is avoided.

Figure 11:
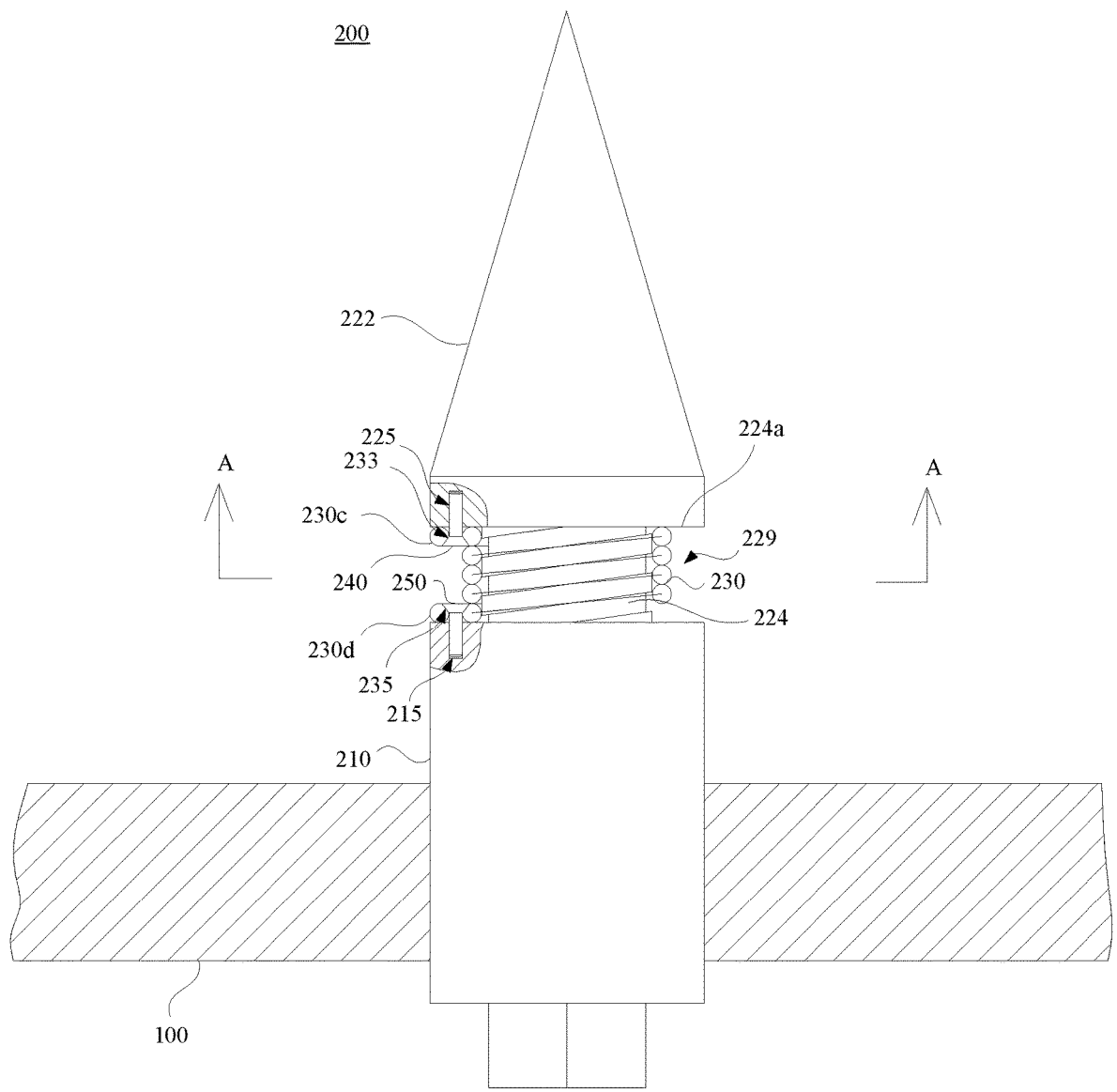
FIG. 11 is a partial structural diagram of a fixing device according to yet another embodiment.
Figure 12:
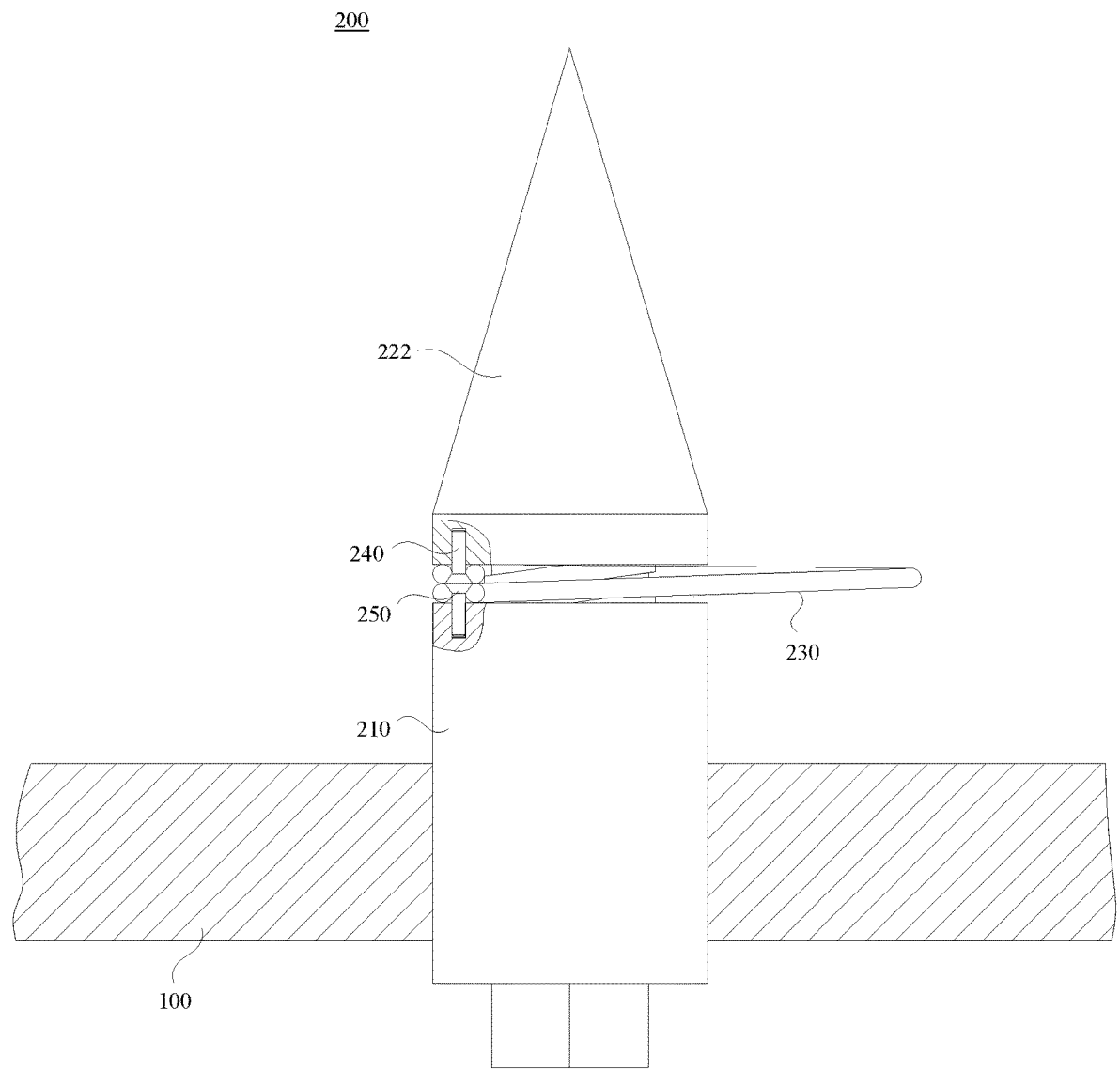
FIG. 12 is a schematic structural diagram of the fixing device shown in FIG. 11 in another state.
Figure 13:
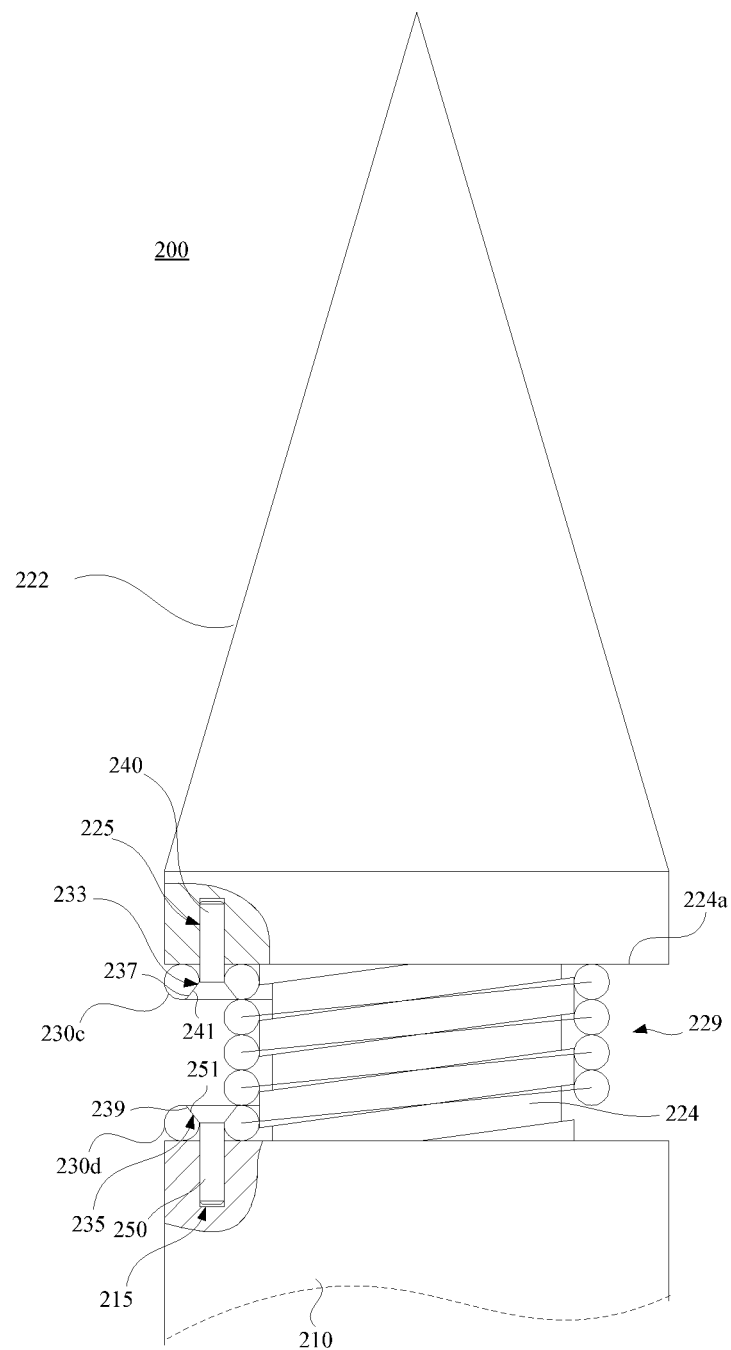
FIG. 13 is a partial enlarged schematic diagram of the fixing device shown in FIG. 11.
Figure 14:
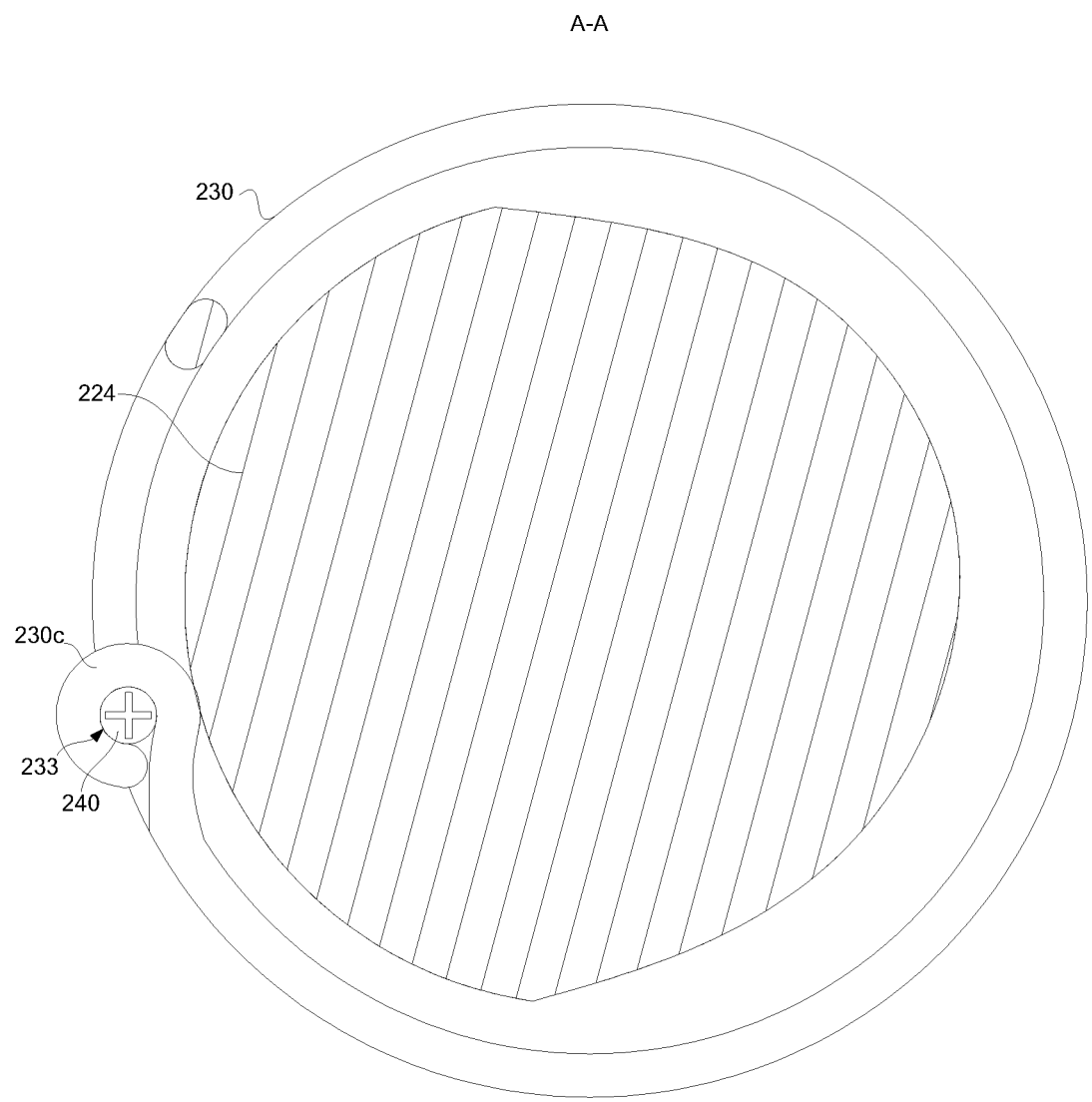
FIG. 14 is a cross-sectional view taken along line A-A of the fixing device shown in FIG. 11.

It can be understood that, as shown in FIG. 11 and FIG. 12, in other embodiments, the two ends of the elastic piece 230 are not limited to be connected to the connecting sleeve 210 and the spike piece 220 in a plug-in manner. In one of the embodiments, the first end of the elastic piece 230 and the second end of the elastic piece 230 are both parallel to the cross section of the spike piece 220. Referring to FIG. 13 and FIG. 14, the first end of the elastic piece 230 is formed with a first curved hook 230c, and the first curved hook 230c is formed with a first fixing hole 233. A second curved hook 230d is formed at the second end of the elastic piece 230, and a second fixing hole 235 is formed in the second curved hook 230d. The fixing assembly 200 further includes a first locking piece 240, a first connecting hole 225 is formed in the outer peripheral wall of the spike piece 220, and the first locking piece 240 is inserted into the first fixing hole 233 and the first connecting hole 225. The first locking piece 240 fixedly connects the first end to the spike piece 220, thereby realizing the detachable connection between the elastic piece 230 and the spike piece 220. The fixing assembly 200 further includes a second locking piece 250, and a second connecting hole 215 is defined on the outer peripheral wall of the connecting sleeve 210. The second locking piece 250 in inserted into the second fixing hole 235 and the second connecting hole 215, so that the second locking piece 250 fixedly connects the second end to the connecting sleeve 210, thereby realizing the detachable connection between the elastic piece 230 and the connecting sleeve 210. In this embodiment, the cross section of the spike piece 220 is perpendicular to the axial direction of the spike piece 220. The first connecting hole 225 and the second connecting hole 215 may be threaded holes, and the first locking piece 240 and the second locking piece 250 may be screws or bolts, so that the structures of the first locking piece 240 and the second locking piece 250 are relatively simple.

In order to make the first locking piece 240 better fix the first end to the spike piece 220, and make the second locking piece 240 better fix the second end to the connecting sleeve 210, as shown in FIG. 13, further, a surface, facing away from the spike piece 220, of the first curved hook 230c is provided with a first abutting inclined surface 237, a first pressing inclined surface 241 is provided at a position where the first locking piece 240 abuts the first curved hook 230c, the first pressing inclined surface 241 abuts against the first abutting inclined surface 237, and prevents the first locking piece 240 from shaking due to the poor abutment reliability at the abutting position with the first end, and the first locking piece 240 can more firmly connect the first end to the spike piece 220. A surface, facing away from the connecting sleeve 210, of the second curved hook 230d is provided with a second abutting inclined surface 239, a second pressing inclined surface 251 is provided at a position where the second locking piece 250 abuts the second curved hook 230d, the second pressing inclined surface 251 abuts against the second abutting inclined surface 239, and prevents the second locking piece 250 from shaking due to the poor abutment reliability at the abutting position with the second end, and the second locking piece 250 can more firmly connect the second end to the connecting sleeve 210.

In order to make the first locking piece 240 better abut against and press the first end, the fixing assembly 200 further includes a first elastic pressing ring. The first elastic pressing ring is mounted outside the first locking piece 240, and the first elastic pressing ring elastically abuts against the inner peripheral wall of the first curved hook 230c, so that the first locking piece 240 can better abut against and press the first end. In order to make the second locking piece 250 abut and press against the second end better, the fixing assembly 200 further includes a second elastic pressing ring. The second elastic pressing ring is sheathed on the second locking piece 250, and the second elastic pressing ring elastically abuts against the inner peripheral wall of the second curved hook 230c, so that the second locking piece 250 can better abut against and press the second end. In this embodiment, the first elastic pressing ring and the second elastic pressing ring are both elastic silicone rings.

In order to avoid the interference of the first locking piece 240 and the second locking piece 250 in the process of fixing and positioning the ton bag, which causes the problem of greater resistance for the fixing assembly 200 to pierce the ton bag, as shown in FIG. 13 and FIG. 14, further, the first connecting hole 225 is defined at the end face, adjacent to the winding portion 224, of the spike end 222. That is, the first connecting hole 225 is formed in the inner peripheral wall of the limit step 224a, so that the first locking piece 240 is accommodated in the accommodating groove 229 in case that the first end is fixedly connected to the spike piece 220. The second connecting hole 215 is formed in the end face of the connecting sleeve 210 near the spike end 222, so that the second locking piece 250 is accommodated in the accommodating groove 229 in case that the second end is fixedly connected to the connecting sleeve 210, and avoid the problem that the first locking piece 240 and the second locking piece 250 interfere in the process of fixing and positioning the ton bag, which causes greater resistance for the fixing assembly 200 to pierce the ton bag. In this embodiment, the diameter of the spike end 222 is greater than the diameter of the winding portion 224, so that the connection between the spike end 222 and the winding portion 224 forms a first connecting end surface, and the first connecting hole 225 is defined on the first connecting end surface. The diameter of the rotating connecting portion 226 is equal to the diameter of the winding portion 224, and the diameter of the spike end 222 is equal to the outer diameter of the connecting sleeve 210, the connecting sleeve 210 is mounted outside and rotationally connected to the rotating connecting portion 226. Since the diameter of the spike end 222 is greater than the diameter of the winding portion 224, the side, adjacent to the spike end, of the connecting sleeve 210 forms a second connecting end surface, the second connecting hole 215 is defined at the second connecting end face, so that an accommodating groove 229 is formed between the spike end 222 and the connecting sleeve 210, and then the elastic piece 230, the first locking piece 240 and the second locking piece 250 are all accommodated in the accommodating groove 229. The first end of the elastic piece 230 is fixed to the first connecting end face by the first locking piece 240, and the second end of the elastic piece 230 is fixed to the second connecting end face by the second locking piece 250.

Figure 15:
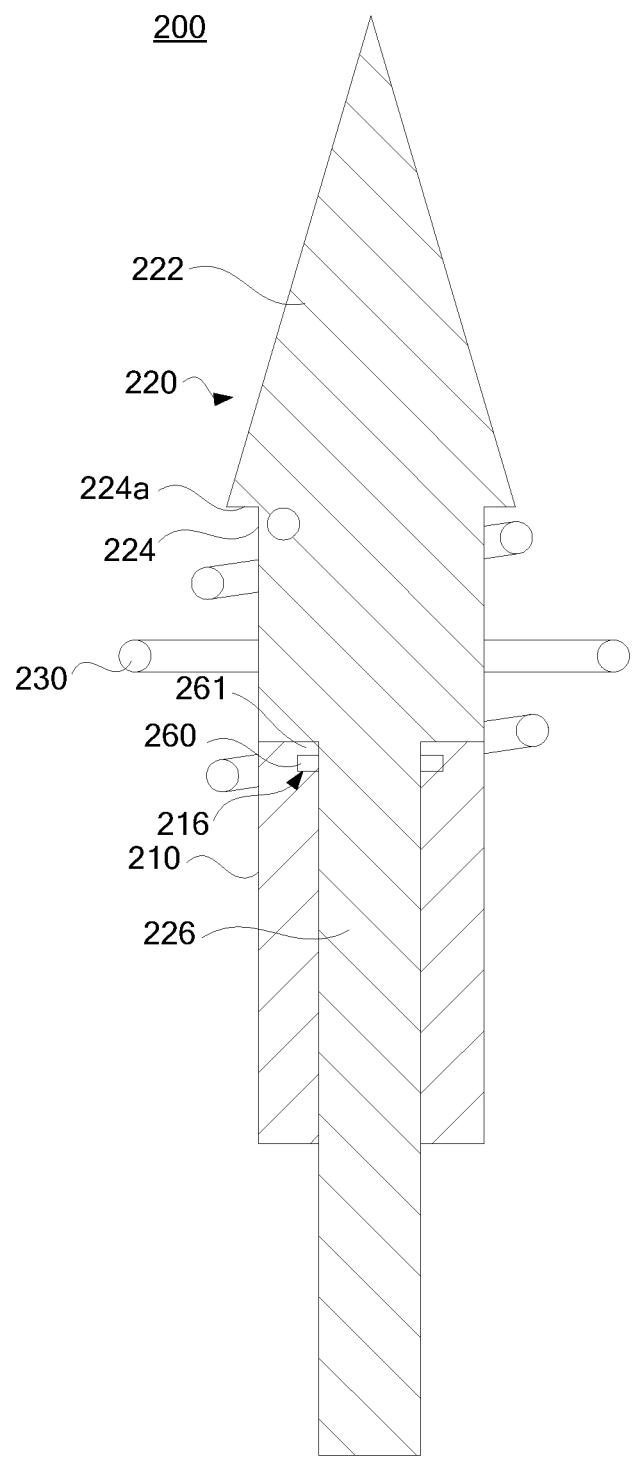
FIG. 15 is a schematic cross-sectional view of a fixing assembly of a fixing device according to yet another embodiment.
Figure 16:
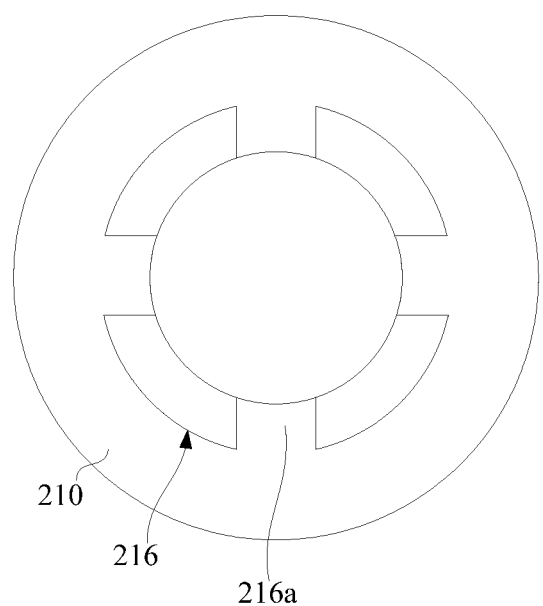
FIG. 16 is a schematic structural diagram of the connecting sleeve of the fixing assembly shown in FIG. 15 from another perspective.
Figure 17:
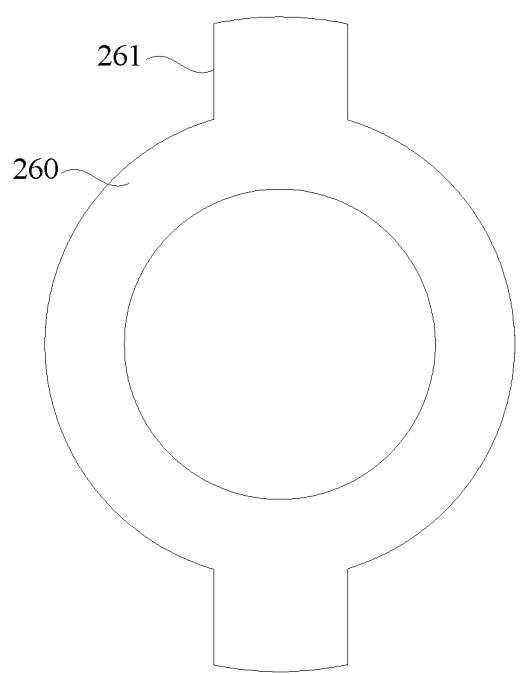
FIG. 17 is a structural diagram of the clamping sealing ring of the fixing assembly shown in FIG. 15 from another perspective.

As the fixing device 10 is used for fixing and positioning ton bags, there is more dust in the surrounding environment of the fixing device 10. Therefore, it is inevitable that part of dust enters through the joint between the spike piece 220 and the connecting sleeve 210, resulting in serious wear at the connection between the spike piece 220 and the connecting sleeve 210. In order to avoid the problem of severe abrasion at the connection between the spike piece 220 and the connecting sleeve 210, as shown in FIG. 15 to FIG. 17, further, a positioning ring groove 216 is formed at the end of the connecting sleeve 210 adjacent to the spike end 222, and the positioning ring groove 216 is disposed around the spike end 222. The fixing assembly 200 further includes a clamping sealing ring 260, the clamping sealing ring 260 is movably sheathed on the spike piece 220, and the clamping sealing ring 260 is arranged in the positioning ring groove 216 and elastically abuts against the connecting sleeve 210, which improves the sealing performance of the connection between the spike piece 220 and the connecting sleeve 210, and avoids the problem of serious wear at the connection between the spike piece 220 and the connecting sleeve 210, thereby prolonging the service life of the fixing assembly 200.

Figure 18:
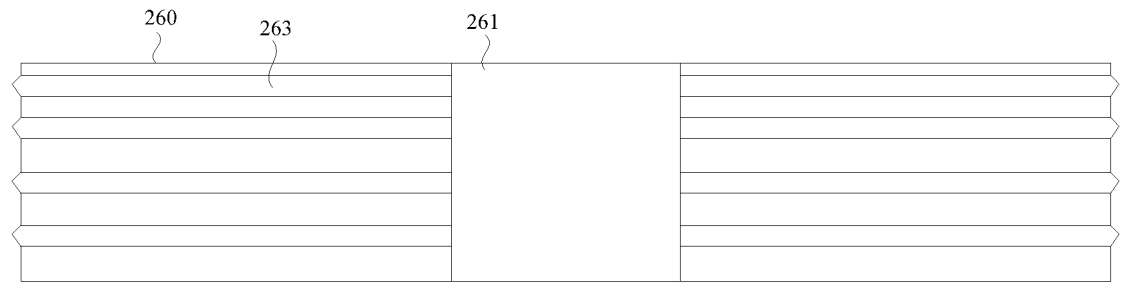
FIG. 18 is a schematic structural diagram of a clamping sealing ring of a fixing assembly of a fixing device according to yet another embodiment.

It can be understood that since the connection between the spike piece 220 and the connecting sleeve 210 requires repeated relative movements, such as the relative rotation of the spike piece 220 and the connecting sleeve 210, as the service time or frequency increases, the clamping sealing ring 260 is severely worn and cannot achieve a better sealing effect. As shown in FIG. 15 to FIG. 17, further, the clamping sealing ring 260 is detachably connected to the spike piece 220, so that the clamping sealing ring 260 is replaced regularly, thereby avoiding the problem that the clamping sealing ring 260 is seriously worn and cannot play a better sealing effect. Furthermore, the clamping sealing ring 260 is provided with a stop protrusion 261, and the inner peripheral wall of the positioning ring groove 216 is provided with a rotation limit stop 216a. There is a clamping gap between the rotation limit stop 216a and the bottom of the positioning ring groove 216, The stop protrusion is used to screw into the clamping gap in case of rotating at a predetermined angle in the positioning ring groove 216. The stop protrusion abuts against the rotation limit stop 216a, so that the clamping sealing ring 260 is clamped and limited in the positioning ring groove 216, and the clamping sealing ring 260 is detachably connected to the spike piece 220. In this embodiment, the clamping sealing ring 260 may be a silicone ring or a rubber ring. In order to make the clamping sealing ring 260 more tightly and elastically abut in the positioning ring groove 216, and referring to FIG. 18, further, the outer peripheral wall of the clamping sealing ring 260 is provided with a sealing flange 263. The sealing flange is located in the positioning ring groove 216 and elastically abuts against the connecting sleeve 210, so that the clamping sealing ring 260 elastically abuts against the positioning ring groove 216 more tightly. In this embodiment, the cross section of the sealing flange is triangular or rectangular or ladder-shaped, the sealing flange is located in the positioning ring groove 216 and is tightly connected with the inner peripheral wall of the connecting sleeve 210, so as to better avoid the problem of dust entering the connection between the connecting sleeve and the spike piece.

Figures 19, 20:
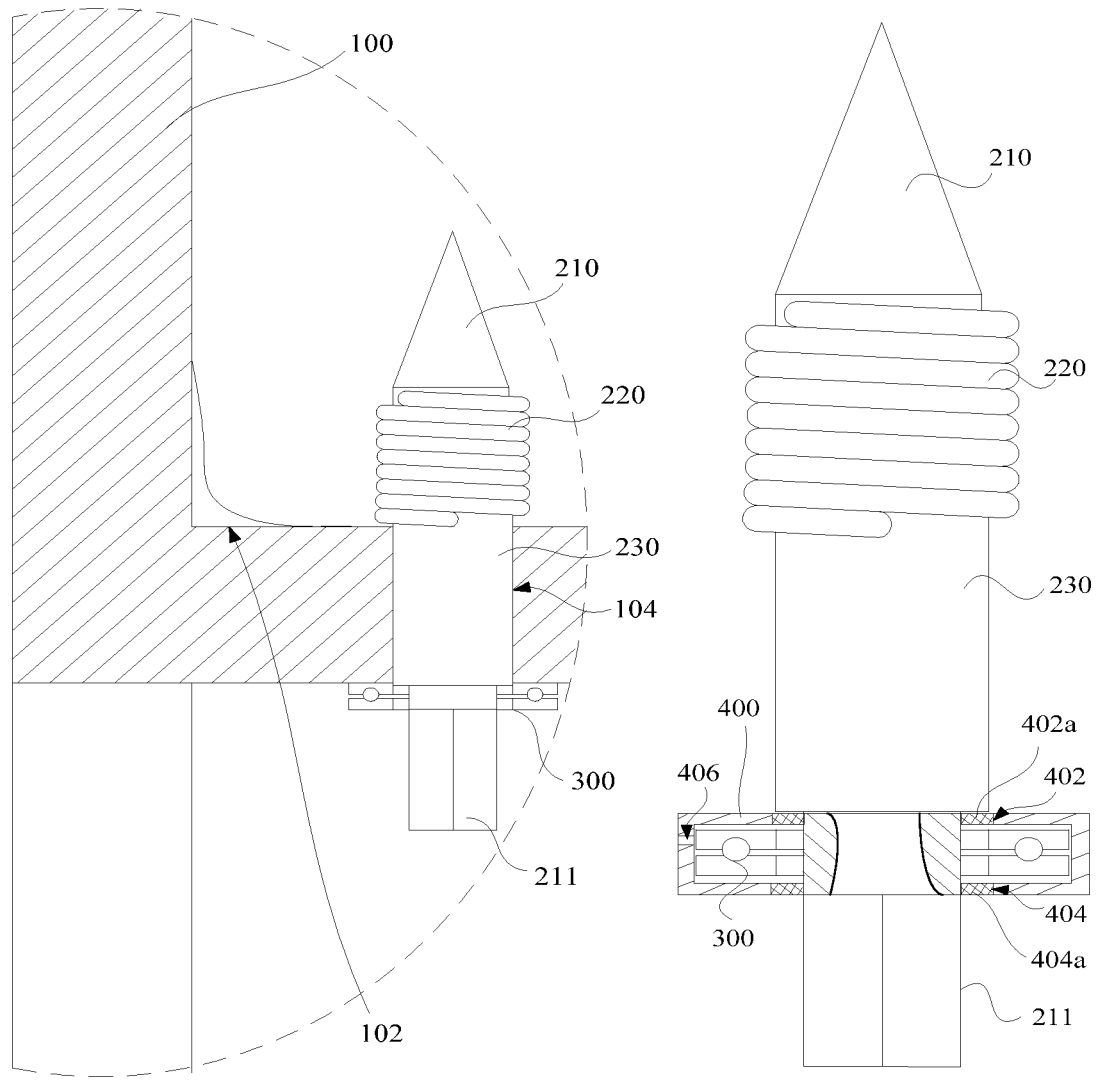
FIG. 19 is a partial enlarged schematic diagram of the fixing device shown in FIG. 1.
FIG. 20 is a partial structural diagram of a fixing device according to yet another embodiment.

In order to make the spike piece 220 rotate more smoothly relative to the connecting sleeve 210, as shown in FIG. 1 and FIG. 19, further, the fixing device 10 further includes a support bearing 300, the support bearing 300 is mounted outside the spike piece 220, and the support bearing 300 is fixedly mounted on the turnover box 100, the end, protruding from the outer side of the turnover box 100, of the spike piece 220 is more stable in the process of rotating relative to the connecting sleeve 210, and the spike piece 220 rotates more smoothly relative to the connecting sleeve 210. However, since the fixing device 10 is used to fix and position the ton bag, there is more dust in the surrounding environment of the fixing device 10, and there is inevitably a problem that some dust enters the support bearing 300 and the support bearing 300 is easily worn out. As shown in FIG. 20, further, the fixing device 10 further includes a dust cover 400, the dust cover 400 covers the support bearing 300, and the dust cover 400 is provided with a first avoiding hole 402 and a second avoiding hole 404. The spike piece 220 penetrates through the first avoiding hole 402 and the second avoiding hole 404. In this embodiment, a first sealing ring 402a is protrudingly provided on the inner peripheral wall of the first avoiding hole 402, and a second sealing ring 404a is protrudingly provided on the inner peripheral wall of the second avoiding hole 404. The first sealing ring 402a and the second sealing ring 404a are mounted outside the spike piece 220, so that the support bearing 300 is sealed in the dust cover 400. Furthermore, the dust in the surrounding environment of the fixing device 10 is not easy to enter the dust cover 400, and the service life of the support bearing 300 is improved. Furthermore, an oil injection hole 406 is defined on the side wall of the dust cover 400, the oil injection hole 406 is arranged corresponding to the balls of the support bearing 300, so that a user may regularly maintain the support bearing 300 through the oil injection hole 406, and the service life of the support bearing 300 is prolonged.

In order to improve the reliability of the fixing and positioning of the ton bag, as shown in FIG. 1, in one of the embodiments, the number of the fixing assembly 200 is multiple, the multiple fixing assemblies 200 are spaced apart, so that the ton bag can be fixed and positioned through the multiple fixing assemblies 200, and the reliability of fixing and positioning the ton bag is improved. In this embodiment, multiple fixing assemblies 200 are arranged at the bottom of the turnover box 100 and spaced apart, so that the fixing assemblies 200 fix and position the bottom of the ton bag.

As shown in FIG. 1, in one of the embodiments, the end, protruding from the outer side of the turnover box 100, of the spike piece 220 is provided with a wrench fitting portion 221, during operation, the wrench tool may act on the wrench fitting portion 221 to make the spike piece 220 rotate relative to the connecting sleeve 210, thus improving the convenience of using the fixing assembly 200. In this embodiment, the wrench fitting portion 221 is a wrench fixing buckle with a square section. Referring to FIG. 2, the fixing device 10 further includes a fixing frame 600. The fixing frame 600 is fixed and supported on the turnover box 100, and a hollow cavity 601 is formed on the side wall of the fixing frame 600. The wrench fitting portion 221 is located in the hollow cavity, and a wrench tool is used to act on the wrench fitting portion 221 through the hollow cavity.

Figure 21:
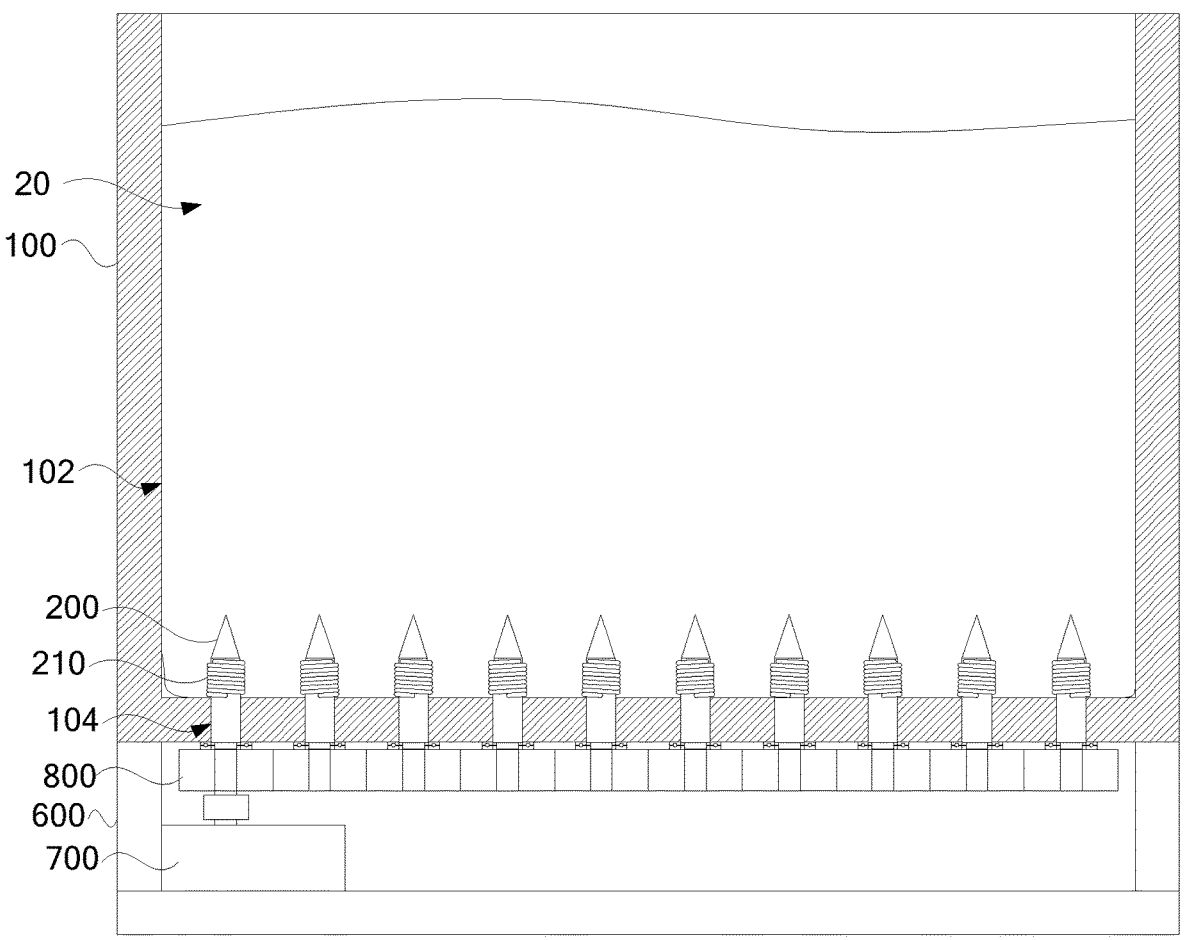
FIG. 21 is a schematic structural diagram of a state of a fixing device according to yet another embodiment.
Figure 22:
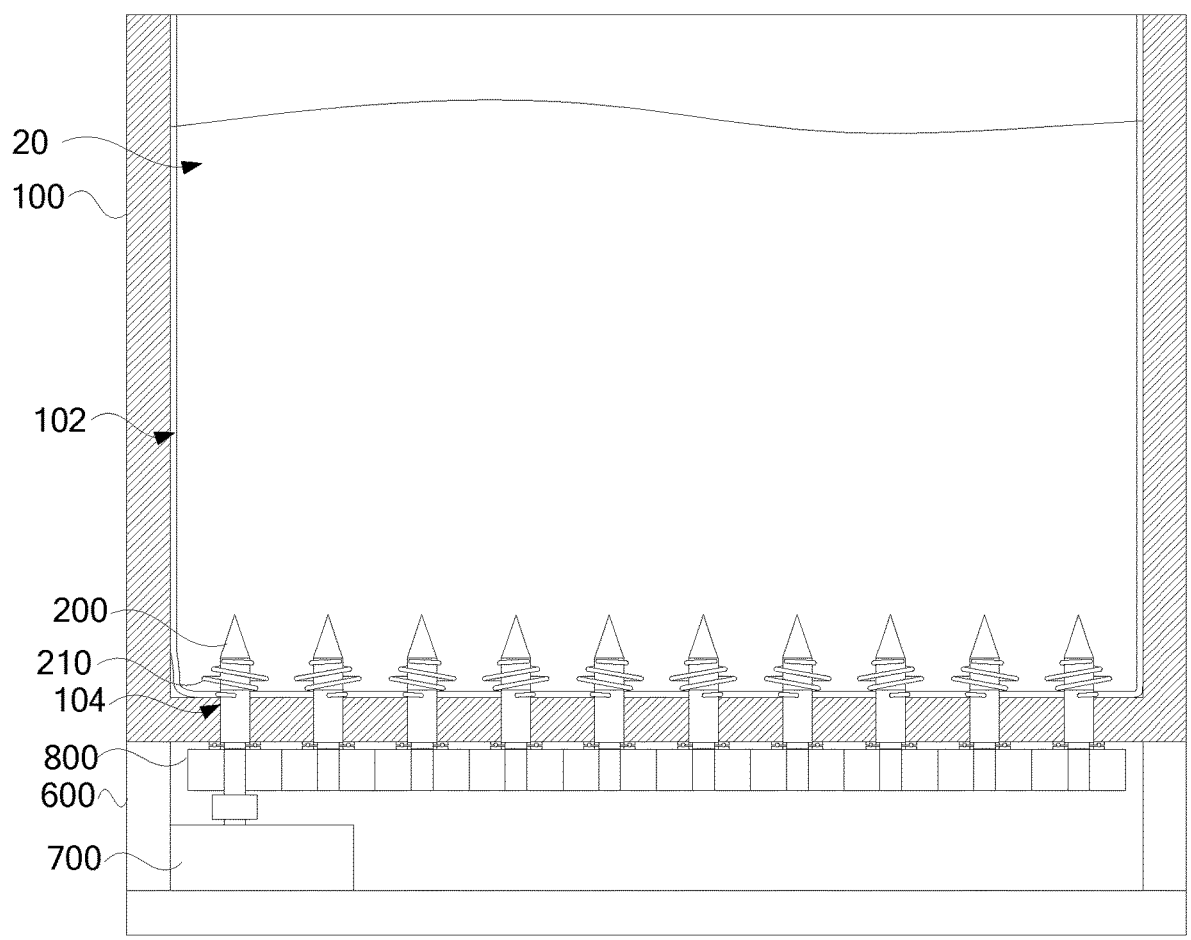
FIG. 22 is a schematic structural diagram of the fixing device shown in FIG. 21 in another state.

It can be understood that in other embodiments, the end, protruding outside the turnover box 100, of the spike piece 220 is not limited to be rotated by setting the wrench fitting portion 221, and the elastic piece 230 is elastically deformed to form a spiral convex elastic structure, so that the spiral convex elastic structure elastically presses and fixes the inner wall of the ton bag. As shown in FIG. 21 and FIG. 22, in one of the embodiments, the fixing device 10 further includes a fixing frame 600 and a driving mechanism 700, the fixing frame 600 is fixed and supported on the turnover box 100, and the driving mechanism 700 is mounted on the fixing frame 600. The power output end of the driving mechanism 700 is connected to the end of the spike piece 220 protruding from the outer side of the turnover box 100, so that the driving mechanism 700 drives the spike piece 220 to rotate relative to the connecting sleeve 210, the elastic piece 230 is elastically deformed to form a spiral convex elastic structure, so that the spiral convex elastic structure elastically presses and fixes the inner wall of the ton bag. In this embodiment, the driving mechanism 700 may be a motor driving mechanism.

As shown in FIG. 21 and FIG. 22, in one of the embodiments, the number of the fixing assembly 200 is multiple, the multiple fixing assemblies 200 are arranged side by side on the turnover box 100. The fixing device 10 further includes multiple transmission gears 800, the multiple transmission gears 800 are sheathed on the spike pieces 220 of the multiple fixing assemblies 200 in a one-to-one correspondence, and the transmission gears 800 are all located outside the turnover box 100. The transmission gears 800 are sequentially meshed and transmitted along the arrangement direction of the fixing assemblies 200, and the spike piece 220 of one of the fixing assemblies 200 is connected to the power output end of the driving mechanism 700. In case that the driving mechanism 700 drives the spike piece 220 of one of the fixing assemblies 200 to rotate relative to the corresponding connecting sleeve 210, the transmission gear 800 corresponding to the fixing assembly 200 transmits the power of the driving mechanism 700 to other transmission gears 800. In this way, the spike pieces 220 of the multiple fixing assemblies 200 rotate relative to the corresponding connecting sleeve 210 at the same time, and multiple fixing assemblies 200 simultaneously fix and position or release the fixed positioning of the ton bag in the turnover box 100, which further improves the convenience of using the fixing device 10. In this embodiment, the elastic pieces 230 of two adjacent fixing assemblies 200 spirally winding and abutting against the outer peripheral wall of the corresponding spike piece 220 in opposite spiral directions. In this way, in case that the driving mechanism 700 drives the spike pieces 220 of one of the fixing assemblies 200 to rotate relative to the corresponding connecting sleeve 210, the rotation directions of the spike pieces 220 of two adjacent fixing assemblies 200 are opposite, and the elastic pieces 230 of the multiple fixing assemblies 200 may simultaneously generate elastic deformation or release elastic deformation. In turn, the multiple fixing assemblies 200 may simultaneously fix or unfix the ton bags in the turnover box 100.

Compared with the conventional technology, the present application at least has the following advantages:
 1. In the fixing assembly 200 of the present application, the connecting sleeve 210 can be fixedly mounted at the mounting position. For example, the connecting sleeve 210 can be fixedly mounted on the inner wall of the accommodating groove of the turnover box 100. Since the spike piece 220 is rotatably connected with the connecting sleeve 210, and one end of the elastic piece 230 is connected to the connecting sleeve 210, the other end of the elastic piece 230 is connected with the spike piece 220, and the elastic piece 230 spirally winds at least the outer peripheral wall of the spike piece 220. In case that the ton bag is placed in the accommodating groove in the turnover box 100 and the spike piece 220 is pierced and inserted into the surface layer of the ton bag, the spike piece 220 rotates relative to the connecting sleeve 210 in the direction opposite to the spiral winding direction of the elastic piece 230. The elastic piece 230 is used to generate elastic deformation in case that the spike piece 220 rotates relative to the connecting sleeve 210 in a direction opposite to the spiral winding direction of the elastic piece 230. An included angle exists between the direction of elastic deformation and the axial extension direction of the spike piece 220, so that the elastic piece 230 bounces outwards and forms a spiral convex elastic structure which opens outwards to the outer peripheral wall of the spike piece 220, which plays a role in elastic pressing and fixing the inner wall of the ton bag. In this way, it plays a fixing and limiting role similar to the "nail cap", and achieves a better fixing effect on the ton bag, that is, the ton bag is better fixed and positioned in the turnover box 100, so as to further dump the ton bag, realize the whole process of fixing and positioning the ton bags conveniently and quickly, and solve the problem of high positioning difficulty of the ton bags;

2. In the fixing assembly 200 of the present application, in case that the ton bag does not need to be fixed, it is only necessary to rotate the spike piece 220 relative to the connecting sleeve 210 in the same direction as the spiral winding direction of the elastic piece 230. That is, the elastic piece 230 can be automatically reset and rotated and tightened around the peripheral wall of the spike piece 220, the spiral convex elastic structure shrinks in and tightly abuts on the outer peripheral wall surface of the spike piece 220, that is, the elastic piece 230 spirally winds around and holds the outer peripheral wall of the spike piece 220. The spike piece 220 can be quickly pulled out from the surface of the ton bag, realizing the state that the ton bag is immediately released in case that the fixed positioning is not required, and avoiding damaging the structure of the ton bag due to the fixed positioning, and realizing the recycling of the ton bag;

3. In the fixing assembly 200 of the present application, in case that the spike piece 220 is pierced and inserted into the surface layer of the ton bag, the spike piece 220 rotates in the forward and reverse directions relative to the connecting sleeve 210, which may realize quick switching between two different states of fixed positioning and unfixed positioning of the ton bag by the fixing assembly 200, the convenience of using the fixing assembly and the positioning efficiency are greatly improved.

The above embodiments only express several embodiments of the present application, and their descriptions are specific and detailed, but they cannot be understood as limiting the scope of the present application. It should be noted that for those skilled in the art, without departing from the concept of the present application, several modifications and improvements can be made, and these all fall within the protection scope of the present application. Therefore, the protection scope of the present application should be determined by the appended claims.

The invention claimed is:

1. A fixing device, comprising a turnover box and a fixing assembly, the fixing assembly comprising:
   a connecting sleeve;
   a spike piece rotatably connected to the connecting sleeve; and
   an elastic piece, wherein one end of the elastic piece is connected to the connecting sleeve, and the other end of the elastic piece is connected to the spike piece, the elastic piece at least spirally winds around and holds an outer peripheral wall of the spike piece, in case that the spike piece rotates relative to the connecting sleeve in a direction opposite to the spiral winding direction of the elastic piece, the elastic piece generates elastic deformation which has an included angle with the axial extension direction of the spike piece to form a spiral convex elastic structure; wherein
   the turnover box is provided with an accommodating groove and a mounting hole which are communicated; the connecting sleeve is located in the mounting hole and is fixedly connected to the turnover box, the spike piece and the elastic piece are both located in the accommodating groove, and one end of the spike piece protrudes from an outer side of the turnover box.

2. The fixing device according to claim 1, wherein a direction of the elastic deformation is perpendicular to an axial extension direction of the spike piece.

3. The fixing device according to claim 1, wherein the elastic piece is a spring wire structure.

4. The fixing device according to claim 3, wherein a cross-sectional diameter of the elastic piece decreases from the middle of the elastic piece to the two ends of the elastic piece.

5. The fixing device ccording to claim 1, wherein the spike piece comprises a spike end, a winding portion and a rotating connecting portion that are connected in sequence, the rotating connecting portion is rotatably connected with the connecting sleeve, one end of the elastic piece is connected to the winding portion, and the elastic piece spirally winds around and holds the outer peripheral wall of the winding portion.

6. The fixing device according to claim 5, wherein a limit step is formed on the outer peripheral wall of the end of the winding portion adjacent to the spike end, one end of the elastic piece is connected to the limit step, and the elastic piece spirally winds around and holds and is limited to the limit step.

7. The fixing device according to claim 1, wherein the connecting sleeve is mounted outside the spike piece and is rotatably connected with the spike piece.

8. The fixing device according to claim 1, wherein the end of the spike piece protruding from the outer side of the turnover box is provided with a wrench matching portion.

9. The fixing device according to claim 1, wherein the fixing device further comprises a fixing frame and a driving mechanism, the fixing frame is fixed and supported on the turnover box, and the driving mechanism is mounted on the fixing frame, and the power output end of the driving mechanism is connected with the end, protruding from the outer side of the turnover box, of the spike piece.

* * * * *